United States Patent [19]

Newberg

[11] Patent Number: 4,635,421
[45] Date of Patent: Jan. 13, 1987

[54] MOLDED DOOR

[75] Inventor: Phillip J. Newberg, Mattawan, Mich.
[73] Assignee: Eliason Corporation, Kalamazoo, Mich.
[21] Appl. No.: 724,233
[22] Filed: Apr. 17, 1985
[51] Int. Cl.⁴ ............................................. E04C 2/34
[52] U.S. Cl. .................................. 52/309.11; 52/802; 52/806; 52/455
[58] Field of Search .................. 52/802, 806, 809, 829, 52/208, 455, 309.1, 309.9, 309.11, 785, 792, 810; 49/489, 501

[56] References Cited

U.S. PATENT DOCUMENTS 2,814,841 12/1957 Brugler ................................. 52/208
3,546,841 12/1970 Smith et al. .................... 52/309.11 X
3,597,891 8/1971 Martin ............................. 52/809 X
3,837,134 9/1974 DiFazio ........................... 52/809 X Primary Examiner—Carl D. Friedman
Attorney, Agent, or Firm—Flynn, Thiel, Boutell & Tanis

[57] ABSTRACT

A door comprises a core comprising a synthetic resin honeycomb core member and a coplanar wood panel along one edge thereof. Front and rear door skins adhere to and sandwich the core. Spaced opposed peripheral edge flanges of the door skins retain a gasket retainer in a peripheral edge slot in the core. A resilient edge gasket extends from the gasket retainer out between the peripheral edge flanges of the door skins. At concentric openings in the core and door skins, the door skins are depressed inboard toward each other to form a common peripheral flange for a window mounting gasket. The method of making the door includes molding the skins and core member from synthetic resin material, slotting the core peripheral edge and inserting the gasket lock member, adhering and pressing the cut skins onto the side-by-side panel and core member forming the core and pressing same together, cutting the window opening and installing the window with its gasket, the hinges, and the edge gasket.

7 Claims, 12 Drawing Figures

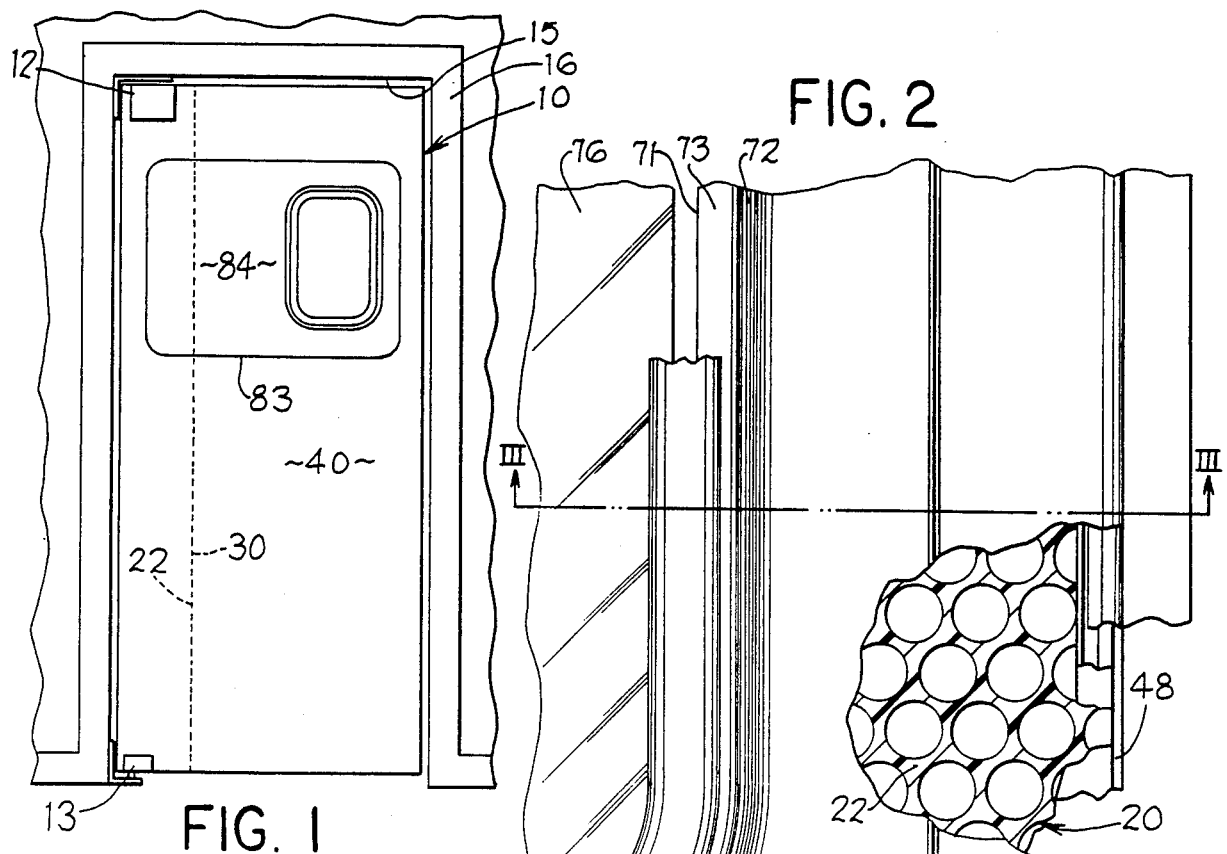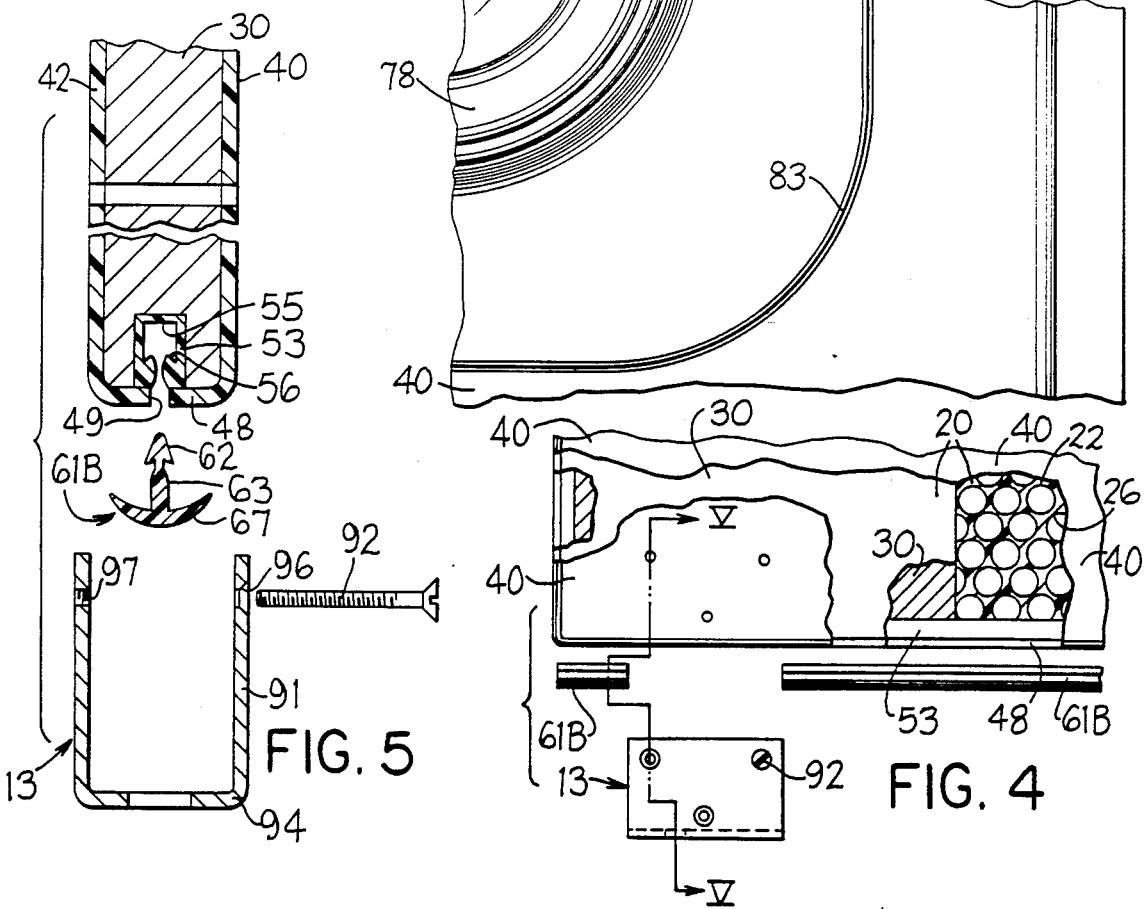

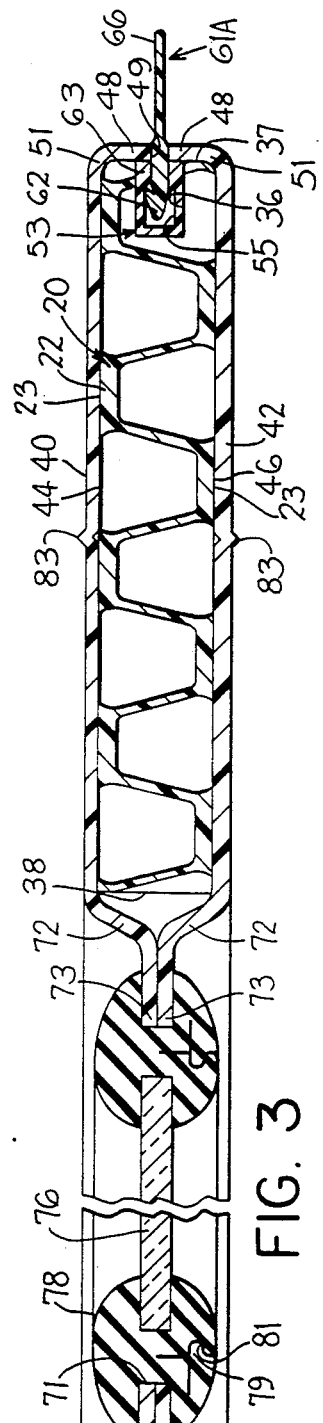
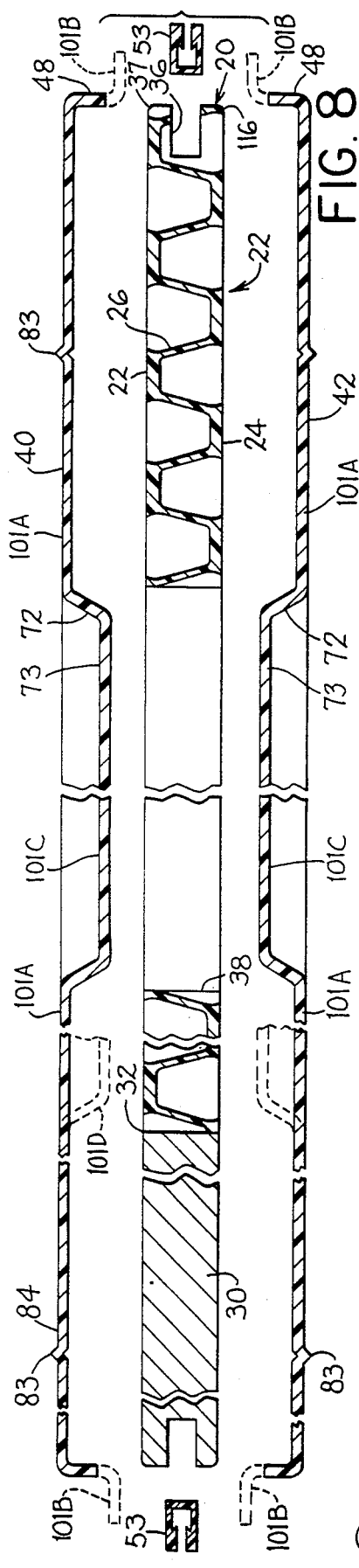
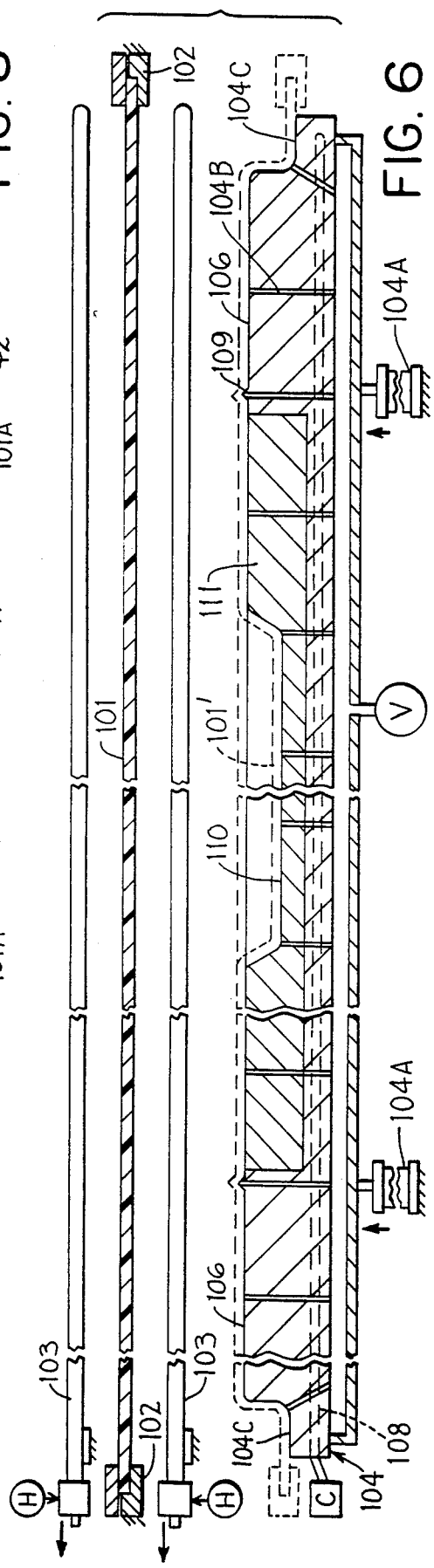

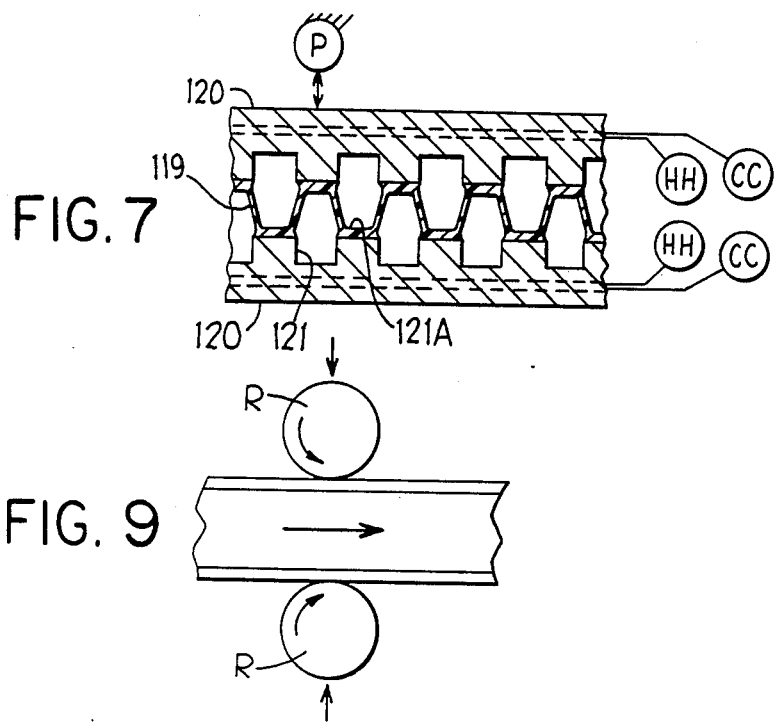
FIG. 7
FIG. 9
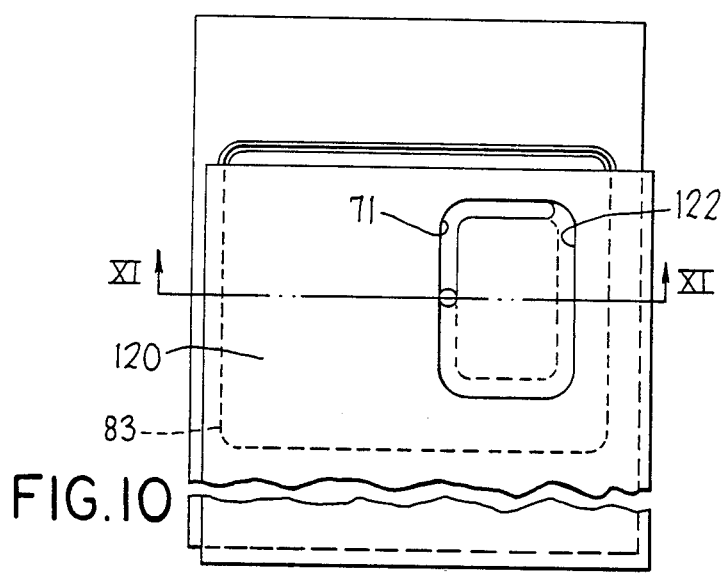
FIG. 10
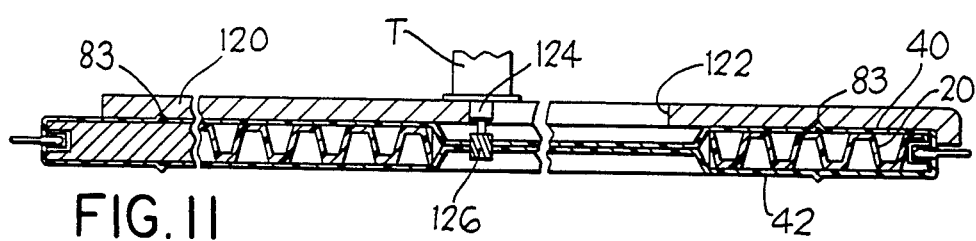
FIG. 11

MOLDED DOOR

FIELD OF THE INVENTION

This invention relates to a molded door construction and a method for making same.

BACKGROUND OF THE INVENTION

Known swinging doors for use in stores, offices and factories have typically included core doors in which a wooden core (plywood, chipboard, or the like) is faced with metal or plastic laminate (for example of FORMICA brand laminate sheet material) sheets. While durable, such doors tend to be relatively heavy, to have a rigid, unyielding surface and may tend to impart an uncomfortable jolt to persons bumping thereinto, to start or stop their swing.

Another known type of swing door utilizes merely a single thickness of sheet metal, such as an aluminum plate. This is considerably thinner than the core-type door above mentioned but may also be relatively heavy, with corresponding inertia problems, if made sturdy enough to resist bending and denting in normal use.

Both known types of doors have been provided with gasketed windows, but the resilient (typically rubber) gasket which holds the window normally extends beyond the adjacent front or rear surface of the door and may thus be cut or knocked out of place by impact with passing persons or things. Further, both of these known types of doors involve difficulties in mounting of door edge gaskets (door edge seals), which may be desired to provide a dust or air seal between paired swinging doors or between a swinging door and its frame, such difficulties being both in gasket installation design and in replacing worn or torn edge gaskets.

Accordingly, the objects of this invention include provision of:

A core door of thermal formed synthetic resin materials, which is relatively lightweight and substantially rigid, which is capable of construction alternately with no window or with a window of a variety of alternate shapes and sizes, wherein the window pane is held in place by a peripheral gasket which is substantially flush with or inboard of the front or rear faces of the door so as to limit any tendency to snag or be damaged by persons or equipment passing through the doorway, in which a peripheral edge gasket is readily and replaceably installed, and in which conventional window panes, window gaskets and mounting hardware and edge seal gaskets are usable.

A door as aforesaid which has front and rear faces substantially free of seams, nuts, screws and the like so as to be free of any tendency to catch on persons or equipment passing through the doorway and so as to be readily cleanable, the material of the front and rear surfaces of the doors being easily maintained clean.

A method for making a door as aforesaid capable of employing a commercially available honeycomb type, synthetic resin core member, in which the front and rear door skins are vacuum formable of conventional synthetic resin materials and in which the assembly of the core and formed skins to produce a finished door is readily carried out with relatively simple tools in a quick and relatively low cost manner.

Further objects and purposes of the invention will be apparent to persons acquainted with apparatus of this general type upon reading the following specification and inspecting the accompanying drawings.

The objects and purposes of the invention are met by providing a door comprises a core comprising a synthetic resin honeycomb core member. Front and rear door skins adhere to and sandwich the core. Spaced opposed peripheral edge flanges of the door skins retain a gasket retainer in a peripheral edge slot in the core. A resilient edge gasket extends from the gasket retainer out between the peripheral edge flanges of the door skins. Windowed and nonwindowed embodiments are contemplated. In a windowed embodiment, at concentric openings in the core and door skins, the door skins are depressed inboard toward each other to form a common peripheral flange for a window mounting gasket. A method of making the door includes molding the skins and core member from synthetic resin material, trimming same to size, slotting the core peripheral edge and inserting the gasket lock member, adhering and pressing the cut skins onto the side-by-side panel and core member forming the core and pressing same together, and installing the window with its gasket (in a windowed embodiment), mounting hardware, and the resilient edge gasket.

BRIEF DESCRIPTION OF THE DRAWINGS

FIG. 1 is a front view of a door embodying the invention installed in a conventional door frame.

FIG. 2 is an enlarged, partially broken fragment of the FIG. 1 door.

FIG. 3 is an enlarged cross-sectional view substantially taken on the line III—III of FIG. 2.

FIG. 4 is an enlarged, fragmentary, partially broken, exploded view of the lower left quadrant of the FIG. 1 door.

FIG. 5 is an enlarged, fragmentary, exploded view substantially taken on the line V—V of FIG. 4.

FIG. 6 is an exploded fragmentary schematic view of apparatus for vacuum forming a door skin.

FIG. 7 is a fragmentary schematic view of a so-called pull-apart type mold for forming a synthetic resin sheet into a honeycomb type core member.

FIG. 8 is a fragmentary exploded view substantially taken along the cutting plane III—III of FIG. 2 and showing the core, front and rear door skins and right and left side gasket retainers prior to assembly together.

FIG. 9 is a schematic view illustrating the pressing together of the door skins against the core by feeding through a conventional pair of compression rolls.

FIG. 10 is a fragmentary view of the front of the door following the FIG. 9 pressing together and showing the simultaneous cutting of a window opening in the window depression portion of the front and rear door skins.

FIG. 11 is a fragmentary sectional view substantially taken on the line XI—XI of FIG. 10.

DETAILED DESCRIPTION

Figure 12:
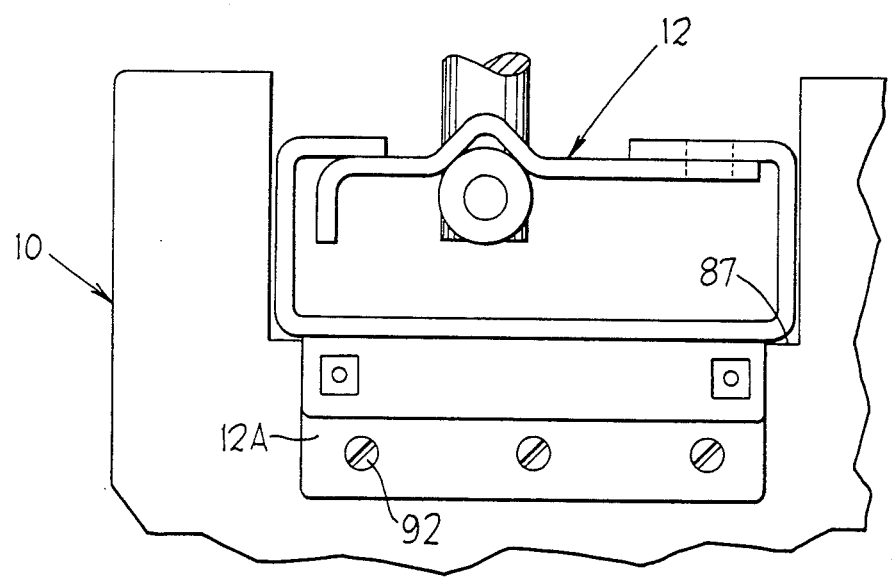
FIG. 12 is an enlarged fragment of FIG. 1 showing the upper hinge.

FIG. 1 shows a door 10 embodying the invention supported by a conventional top and bottom hinges 12 and 13 (which for illustration are of a type shown in U.S. Pat. No. 3,289,244) in a door opening 15 bounded by a conventional door frame 16. While the door 10 embodying the invention could otherwise be supported, and will often be used in pairs, with swinging edges close adjacent, FIG. 1 serves to show one example of installation of a door embodying the invention.

The door 10 (FIGS. 2–4 and 8) comprises a core 20, at least the major area of which is a honeycomb type member 22 of rigid synthetic resin material, in the preferred embodiment shown polystyrene. The particular honeycomb member 22 shown has front and rear faces 23 and 24 which are substantially planar except for a plurality of side-by-side spaced dimples 26, the dimples in each face being opposed to substantially planar portions in the opposite face. This provides a rigid lightweight core member which nevertheless has relatively large surface areas on the opposite faces thereof to enhance bonding to skins hereafter discussed.

While it is contemplated that the door 10 may have its entire core constructed of the honeycomb member 22, in the preferred embodiment shown, the core 20 along one side edge (the left edge in FIG. 1) of the door 10 is a wood panel 30, preferably a piece of plywood, particle board or the like, which may provide a more secure foundation to which to fasten hinge members hereafter discussed. The wood panel 30 occupies a lesser area of the core 20 than the honeycomb member 22 and in one door constructed according to the invention, which was approximately 36" wide, the wood panel was approximately 7" wide. The wood panel 30 and honeycomb member 22 have abutting side edges at 32 (FIG. 8).

A substantially rectangular cross-section slot 36 (FIGS. 3 and 8) is substantially centered on and extends along the peripheral edge 37 of the core, around the entire perimeter of the core 20. The core may be windowless or, as in the embodiment shown, may be provided with a window port 38 therethrough.

Substantially rigid, preferably mirror imaged, front and rear door skins 40 and 42 (FIG. 3) of molded synthetic resin sheet material have a thickness substantially less than that of said core and are adhesively bonded at 44 and 46 to the front and rear faces 23 and 24 respectively of the core 20 by adhesive not shown. In the preferred embodiment shown, the adhesive is a contact adhesive.

The front and rear door skins 40 and 42 are each shaped substantially like a shallow tray with a peripheral edge flange 48 extending substantially perpendicular to the plane of the door and continuing around the perimeter of each door skin. As seen in FIG. 3, the peripheral edge flanges 48 of the front and rear door skins 40 and 42 extend toward each other along the peripheral edge 37 of the core sufficient to partly overlap the slot 36 in the core but are spaced apart to define a peripheral edge gap 49 therebetween centered on the slot 36. Thus, the opposed peripheral edge flanges 48 effectively narrow the open side of the slot 36. The edge corners of the core are rounded at 51 to conform to the interior radius of the joinder of the peripheral edge flange 48 to the face area of the corresponding door skin 40 or 42. The peripheral edge flange 48 snugly engages and is adhesively bonded to the peripheral edge 37 of the core 20.

Snugly received in the peripheral edge slot 37 is a gasket retainer 53 which extends along the slot 36 and is trapped therein by the flanges 48 of the door skins 40 and 42. The gasket retainer has an undercut groove 55 extending therealong and having inboard directed barbs 56 (FIG. 5). The gasket retainer 53 is of substantially rigid synthetic resin material.

A resilient edge gasket 61 (as at 61A in FIG. 3 or 61B in FIG. 5), which may be of rubber or the like, has a barbed inboard edge portion 62 adapted to be pressed into the gasket retainer 53 past the barbs 56 so as to be entrapped thereby in inboard portion of the undercut groove 55. The resilient edge gaskets 61A and 61B each also have an intermediate portion 63 adapted to be snugly but slidably received in the narrow outboard portion of the undercut groove 55 of the gasket retainer. The resilient edge gaskets 61A and 61B differ in their outboard portions, the upper portion 66 of the edge gasket 61A (FIG. 3) being formed as a thin flexible fin extending outboard from the edge of the door for sealing against a door frame or adjacent door edge or a similar fin on an adjacent door edge. On the other hand, the outboard portion 67 of the edge gasket 61B (FIG. 5) is formed as a T-head to snugly abut against the exterior faces of the edge flanges 48 of the door skins to thereby close the gap 49 between the opposed edges of the flanges 48.

In the preferred embodiment shown, the door skins are of a mixture of PVC (polyvinyl chloride) and ABS (acrylonitrile-butydene-styrene) extruded into a sheet, and available under the tradename ROYALITE 59 from Uniroyal Engineered Polymer Products in Chicago, Ill. The synthetic resin portion 22 of the core 20 is in the embodiment shown available under the tradename NOR CORE from Northfield Corporation located at Danbury, Conn. In one embodiment, core thickness was about ¼ inch and skin thickness was between 0.090 and 0.10 inch. The gasket retainer in the embodiment shown is of styrene or rigid vinyl.

The window skins 40 and 42 have aligned openings therethrough together defining a window opening 71 (FIG. 3). More particularly, the door skins 40 and 42 have ramps 72 angling in toward each other at the edge of the window port 38 in the core 20, the ramps being at approximately a 60° angle to the central plane of the core and meeting substantially at said central plane. The skins 40 and 42 continue through the ramps 72 to meet and extend further into the window port 38 as face to face engaging flanges 73. The flanges 73 terminate a short distance beyond the ramps to define the window opening 71. The flanges 73 are adhesively bonded together by means of the same adhesive establishing the adhesive bond at 44 and 46.

A window pane 76, for example of glass or transparent or translucent plastic, is spaced within the window opening 71 in coplanar relation with the adhesively bonded flanges 73 by a resilient gasket 78 of rubberlike material and generally H-shaped cross-section. One opposed legs of the H grips the window pane 76 therebetween and the other pair of legs of the H grips therebetween the flanges 73. In the embodiment shown, the gasket 78 is a conventional one equipped with a locking lip 79 insertable into an adjacent groove 81 to forcibly clamp the legs of the H section gasket against the flanges 73 on the one hand and the window pane 76 on the other hand.

For purposes appearing hereafter, a raised feature line 83 (FIGS. 2 and 3) appears on the outer faces of the door skins 40 and 42 and defines a rectangular field 84 therewithin, and within which the window opening 71 is loosely located.

Turning now to the door mounting hardware, in the preferred embodiment shown, the door skins and core are cut away to form a notch 87 (FIG. 12) to recess therein the upper hinges 12. The latter has a downward opening, channel shaped mounting portion 12A which receives therein the door 10 below the notch 87 and is secured thereto by bolts, or machine screws 92 as hereafter discussed with respect to the bottom hinge 13. The depending legs of the channel 12A sandwich therebetween the skins 40 and 42 and core panel 30. In the embodiment shown, the bottom hinge 13 comprises a channel shaped member 94 with opposed through and threaded openings 96 and 97 in the opposed side plates 91 thereof here for receiving machine screws 92 to snugly clamp the skins and core between the side plates 91 of the hinge member. The door edge gasket 61a or 61b does not extend through the channel shaped member 94 but merely extends out to the opposite edges thereof.

The door 10 is constructed in the following manner.

As schematically shown in FIG. 6, a first synthetic resin sheet 101 is formed in a conventional vacuum forming apparatus, in which a fixed frame 102 supports the peripheral edges of the sheet 101. Conventional energy sources (e.g. electrical sources) heat retractable heaters 103 warm the top and bottom surfaces of the sheet 101 to soften same and then at least the bottom one is retracted sufficient to allow a vacuum forming mold 104 to be raised by cylinders 104A to push up against 104. The softened sheet. The major central area of the softened sheet 101 is drawn over a major plateau 106 on the face of the mold 104 by drawing a vacuum through said mold by means of tiny passages 104B therethrough communicating with a suitable vacuum source V. A minor part of the sheet area is drawn over a feature line ridge 109 on the mold plateau 106. A further part of the central area of the sheet 101 is drawn down into a depression 110 in a replaceable block 111 loosely surrounded by the feature line ridge 109, the depth of the depression 110 being less than the height of the plateau 106. The edge portions of the sheet 101 are drawn down onto the depressed edges 104 (of the mold 104. The shape of the sheet 101 thus molded to the face of the mold 104 is shown in dotted lines at 101'. After molding, the mold 104 may be cooled to cool the sheet and speed hardening and release, by means of a conventional coolant source C and cooling means schematically indicated in dotted lines at 108. In this manner is produced a door skin blank of the kind indicated in dotted and solid line at 40 in FIG. 8. By rotating the block 111 180° in a plane parallel to the door, another and similar synthetic resin sheet can be molded to form a door skin blank which is a mirror image of the first produced one, and which therefore would correspond to the door skin blank shown in dotted and solid lines at 42 in FIG. 8. Thus, each door skin blank has a major central area 101A in a plane parallel to and raised above the plane of the sheet perimetral edges 101B, the raised feature line loop 83, and a window depression 101C.

By substituting blocks 111 with window depressions 110 of different size, shape and location, window depressions 101C of correspondingly different size, shape and location can be formed in the stem 40 or 42 within the feature line 83, for example as indicated at dotted line at 101D in FIG. 8.

After release from the vacuum forming mold 104, an L cross-section peripheral edge portion, including the formerly clamped edges 101B (and indicated in dotted lines in FIG. 8) is severed from the remainder of the door skin blank, leaving the peripheral edge flange 48 above discussed.

In the present embodiment, the core member 22 is formed from a third synthetic resin sheet 119 in a pull-apart type mold schematically shown in FIG. 7. The opposed mold members 120 have staggered cavities 121, with the mold faces 121A therebetween being heated by a suitable heat source HH and capable of being pressed together against the sheet 119 to soften same and thus stick thereto. The mold numbers 120 are then pulled apart toward their FIG. 9 position by suitable pressure means P, so as to pull the synthetic resin sheet 119 into the waffle-like shape shown. Chilling the mold members 120 with a cooling source CC chills the resin sheet 119 to release same from the surfaces 120A of the mold members 120. This produces a honeycomb member like that at 22.

After release from its mold members 120, the core member 22 (FIG. 8) is trimmed to the desired size (width and height) and the window opening 38 is cut therein. If the core 20 is to include a wood panel 30, same is cut to size. The slot 36 is cut (for example routed) around the perimeter of the core 20. The corner edges along the core periphery are rounded (as by a router with a rounding bit) as indicated at 116. In this manner, the core 20 is sized and shaped to fit snugly between the front and rear door skins 40 and 42.

Prior to installation of the door skins on the core, the substantially U-cross-section gasket lock members 53 are installed in the core slots 36 so that the undercut groove 55 of each faces outward. Adhesive (not shown), preferably a conventional contact adhesive suitable to the materials to be joined, is applied to the opposed surfaces of the core 20 and door skins 40 and 42 and the front and rear door skins are pressed against the front and rear surfaces of the core, for example by passing the skins-core sandwich through conventional pressing rolls schematically indicated in FIG. 9, to produce the substantially rigid sandwich of door skins 40, 42 and core 20 with the retainers 53 trapped in the slots 36 by overlapping thereof by the peripheral flanges 48 of the door skins.

The window opening 71 (FIG. 3) is cut out of the depressed area 101C of the front and rear door skins. In the preferred embodiment shown in FIGS. 10 and 11 this is readily accomplished by placing a template 120 at a fixed location with respect to swinging edge and bottom of the door, which serves to positively and accurately locate same on the upper one of the door skins, for example door skin 40. A hole 122 in the template corresponds in size and shape and location to the desired window opening 71 to be cut. A cutting tool T, for example a router, is located on the template. In the embodiment shown, the router has a guide roller 124 which bears on and is guided by the edge of the hole 122 in the template, the tool T mounting a cutter 126 of conventional kind coaxially with the guide roller 124 to bear against and cut the flanges 73 of the door skins to form the edge of the window openings 71. The template and tool can then be removed.

A window pane 76 (FIG. 3) surrounded by a gasket 78 is then placed adjacent the window opening 71 and a leg of the gasket is deflected to mount the gasket over the edge of the window opening 71 of the door skins to thereby complete installation of the window.

Selected edge portions of the door skins and core cut away, by means of a router or other cutting tool, to provide the recesses 87 for receiving the top hinge 12. A resilient edge gasket 61A and/or 61B can then be installed in the gasket retainers 53 along the edges of the door. The door can then be hung in a door opening as at 15.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A door construction comprising:

a core having a slot in and extending along a peripheral edge thereof and spaced from the front and rear faces thereof;

substantially rigid front and rear door skins of molded synthetic resin material sheet having a thickness substantially less than that of said core; said door skins each having a shallow tray shape including a peripheral edge flange, the peripheral edge flanges of said front and rear skins being opposed to each other in coplanar fashion and partly overlapping said slot and narrowing the open side thereof;

a gasket retainer extending along said slot and trapped therein by said peripheral edge flanges of said door skin; and a resilient edge gasket removably retained in said gasket retainer, a window port in the core and spaced inboard of the periphery of the core, said front and rear door skins having face portions adhesively bonded to the front and rear faces of said core respectively, said door skins each having a window opening in registry with said window port, said skins having a bend at the edge of the core window port, said skins having respective ramps extending from said bends, inward toward each other, said ramps converging each at about a 60° angle to the central plane of the core, said ramps meeting adjacent the central plane of said core with face to face engaging flanges adhesively bonded together and defining the boundary of the window opening in said skins, adjacent ramps of said skins lying close inboard of the edge of the core window port, a resilient window gasket of substantially H-cross section having inboard and outboard grooves, said window flanges of said skins being received in said outboard groove, a window pane received in said inboard groove such that said window pane is substantially in the central plane of said door core, said H-cross-section gasket having a total thickness somewhat less than that of said door so as to lie between the planes of the outer surfaces of said door skins and thereby being protected from snagging and the like, said core being entrapped between said window opening ramps and said peripheral edge flanges of said front and rear door skins in directions parallel to the plane of the door.

2. The apparatus of claim 1 in which the core has a major area surrounding said window and consisting of a synthetic resin sheet deformed as a waffle-type panel with each of the front and rear surfaces thereof being substantially planar except for a plurality of side-by-side spaced dimples, the dimples in one surface being backed by undimpled areas in the other surface, the front and rear skins being directly adhesively bonded to the surface of the adjacent undimpled areas.

3. A door construction comprising:

a core having a slot in and extending along a peripheral edge thereof and spaced from the front and rear faces thereof;

substantially rigid front and rear door skins of molded synthetic resin material sheet having a thickness substantially less than that of said core; said door skins each having a peripheral edge flange, said front and rear door skins being adhesively bonded to the front and rear faces of said core respectively with the peripheral edge flanges of said front and rear skins opposed to each other in coplanar fashion and partly overlapping said substantially rectangular slot and narrowing the open side thereof, said slot being of rectangular cross section and extending along top, bottom and two side peripheral edges of said core, each door skin being a one-piece element of shallow tray shape having a central face portion continuing at its top, bottom and side edges through substantially a right angle onto said peripheral edge flange, said peripheral edge flange thus extending along the top, bottom and side edges of its respective door skin, the free edge of said peripheral edge flange being the free edge of the door skin;

a gasket retainer extending along said slot and trapped therein by said flanges of said door skin, said gasket retainer having an undercut groove opening out through said gap between said peripheral edge flanges, said gasket retainer being of U-shaped cross section defined by an inner bight from which outwardly extends a pair of spaced legs, the outward portions of the legs having opposed inward facing steps defining an undercut entry into said groove in said gasket retainer, said legs being spaced by said undercut groove, said gasket retainer leg outward edges being flush with the peripheral edge of said core, said peripheral edge flanges of said front and rear skins respectively overlapping said outward edges of said gasket retainer legs, the outward edges of said legs respectively abutting the inward face of the peripheral edge flanges of the front and rear door skins, such that said door skins positively fix said gasket retainer in said core slot; and a resilient edge gasket removably retained in said undercut groove, said gasket having an enlarged inner edge cooperating with said steps of said undercut groove to positively retain same therein and having an outer edge protruding beyond said door skin flanges.

4. The apparatus of claim 3, in which said gasket retainer has inboard directed barbs defining the undercut portion of the groove thereof, said gasket having an outboard directed barb on its inboard edge to engage with a given one of the barbs on the retainer to prevent unintended removal of the edge gasket from the retainer, the outboard portion of said gasket extending outward beyond said flanges.

5. The apparatus of claim 3 in which the core has a major area consisting of a synthetic resin sheet deformed as a waffle-type panel with each of the front and rear surfaces thereof being substantially planar except for a plurality of side-by-side spaced dimples, the dimples in one surface being backed by undimpled areas in the other surface, said core having a minor area comprising a panel primarily of wood of thickness corresponding to that of the waffle panel and edge abutting said waffle panel, said wood panel being disposed between said waffle panel and one edge of the door, said wood panel and waffle panel being held in non-movable relative relation only by said front and rear skins, there being no bond between the adjacent edges of the waffle panel and wood panel, said front and rear skins holding together said wood panel and waffle panel by (1) adhesive bonding of said skins to said panels and (2) snug confinement of said panels by said peripheral edge flanges of said front and rear door skins along the top, bottom and sides of the core, said rectangular cross-section slot running continuously along the peripheral edge of the core such that part of the slot is in the peripheral edge of the wood panel and part in the peripheral edge of the waffle panel, the adjoining edges of the wood panel and waffle panel being free of said slot;

door support members fixed to the top and bottom ends of said wood core and engaged with said front and rear skins to support said door, said edge gasket being discontinued at the location of said support means;

a window port in the waffle panel and spaced inboard of the periphery of the waffle panel, the door skins each having a window opening in registry with the window port in said waffle panel, said skins having a bend at the edge of the window port, said skins having respective ramps extending from said bends inward toward each other, said ramps converging each at about a 60° angle to the central plane of the waffle panel, said ramps meeting adjacent the central plane of the waffle panel with face-to-face engaging flanges adhesively bonded together and defining the boundary of the window opening in said skins, adjacent ramps of said skins lying close inboard of the edge of the window port in the waffle panel, the window opening ramps and the peripheral edge flanges of the front and rear door skins coacting to mechanically entrap the core therebetween in all directions parallel to the plane of the door, such that the front and rear skins together create a generally toroidal confinement for the core.

6. A door construction comprising:
a rectangular core having a major area consisting of a synthetic resin sheet deformed as a waffle type panel with each of the front and rear surfaces thereof being substantially planar except for a plurality of side by side spaced dimples, the dimples in one surface being backed by undimpled areas in the other surface;

rectangular, substantially rigid front and rear door skins of molded synthetic resin material sheet having a thickness substantially less than that of said core, said core having a minor area comprising a panel primarily of wood of thickness corresponding to that of the waffle panel and edge abutting said waffle panel, said wood panel being disposed between said waffle panel and one edge of the door, said door skins each having a shallow dish shape bounded by a peripheral edge flange extending along the four sides of the core, said front and rear door skins being adhesively bonded to the front and rear faces of said core respectively, said wood panel and waffle panel being held in nonmovable relative relation by said front and rear skins, and including support means for movably supporting said door and secured to said wood panel adjacent said edge, a slot which is spaced from the front and rear faces of the core and runs continuously along the peripheral edge of said core, such that part of said slot is in the peripheral edge of the wood panel and part in the peripheral edge of the waffle panel, the adjoining edges of said wood panel and waffle panel being free of said slot, the peripheral edge flanges of said front and rear skins opposed to each other in coplanar fashion and partly overlapping said substantially rectangular slot and narrowing the open side thereof;

a gasket retainer extending along said slot and trapped therein by said peripheral edge flanges of said door skin, said gasket retainer having an undercut groove opening out through said gap between said flanges; and a resilient edge gasket removably retained in said undercut groove, said gasket having an enlarged inner edge cooperating with said undercut groove to retain same therein and having an outer edge protruding beyond said door skin flanges.

7. The apparatus of claim 6, wherein said core is of polystyrene and said skins are of a PVC and ABS mixture.

* * * * *